United States Patent
Kim et al.

(10) Patent No.: US 8,980,463 B2
(45) Date of Patent: Mar. 17, 2015

(54) SECONDARY BATTERY AND COVER ASSEMBLY EMPLOYED THEREIN

(75) Inventors: Sung-Jong Kim, Daejeon (KR); Cha-Hun Ku, Daejeon (KR)

(73) Assignee: LG Chem, Ltd. (KR)

( * ) Notice: Subject to any disclaimer, the term of this patent is extended or adjusted under 35 U.S.C. 154(b) by 57 days.

(21) Appl. No.: 13/549,720

(22) Filed: Jul. 16, 2012

(65) Prior Publication Data

US 2012/0282504 A1 Nov. 8, 2012

Related U.S. Application Data

(63) Continuation of application No. PCT/KR2011/001957, filed on Mar. 22, 2011.

(30) Foreign Application Priority Data

Mar. 22, 2010 (KR) .................... 10-2010-0025099
Mar. 22, 2010 (KR) .................... 10-2010-0025101

(51) Int. Cl.
| | | |
|---|---|---|
| *H01M 2/04* | (2006.01) | |
| *H01M 2/12* | (2006.01) | |
| *H01M 2/26* | (2006.01) | |
| *H01M 10/052* | (2010.01) | |
| *H01M 10/0587* | (2010.01) | |

(52) U.S. Cl.
CPC .......... *H01M 2/0426* (2013.01); *H01M 2/0486* (2013.01); *H01M 2/1241* (2013.01); *H01M 2/263* (2013.01); *H01M 10/052* (2013.01); *H01M 10/0587* (2013.01); *Y02E 60/122* (2013.01)

USPC .................. 429/164; 429/82; 429/163

(58) Field of Classification Search
CPC .................................................. H01M 2/0426
USPC ............................................................ 429/82
See application file for complete search history.

(56) References Cited

U.S. PATENT DOCUMENTS

| | | | | |
|---|---|---|---|---|
| 4,629,665 A | * | 12/1986 | Matsuo | 429/164 |
| 6,210,835 B1 | * | 4/2001 | Arai | 429/231.95 |
| 2005/0214634 A1 | * | 9/2005 | Kim | 429/53 |
| 2007/0009785 A1 | * | 1/2007 | Kozuki et al. | 429/53 |
| 2010/0190053 A1 | * | 7/2010 | Suzuki | 429/185 |

FOREIGN PATENT DOCUMENTS

| | | |
|---|---|---|
| JP | 06215760 A | 8/1994 |
| JP | 2004273139 A | 9/2004 |
| JP | 2005294216 A | 10/2005 |
| KR | 20060097481 A | 9/2006 |

(Continued)

OTHER PUBLICATIONS

International Search Report for Application No. PCT/KR2011/001957 dated Oct. 28, 2011.

*Primary Examiner* — Ula C. Ruddock
*Assistant Examiner* — Scott J Chmielecki
(74) *Attorney, Agent, or Firm* — Lerner, David, Littenberg, Krumholz & Mentlik, LLP (57) ABSTRACT

Disclosed is a secondary battery including an electrode assembly, a casing and a cover assembly. In the electrode assembly, a cathode plate and an anode plate are arranged to face each other through a separator. The casing is adapted to house the electrode assembly therein. The cover assembly includes a metallic cover welded to an open end of the casing.

8 Claims, 5 Drawing Sheets

(56) References Cited

FOREIGN PATENT DOCUMENTS

| | | |
|---|---|---|
| KR | 20070080866 A | 8/2007 |
| KR | 20090046469 A | 5/2009 |
| WO | WO 2009014068 A1 * | 1/2009 |

* cited by examiner

FIG. 1

PRIOR ART

SECONDARY BATTERY AND COVER ASSEMBLY EMPLOYED THEREIN

CROSS-REFERENCE TO RELATED APPLICATION

The present application is a continuation of International Application No. PCT/KR2011/001957 filed on Mar. 22, 2011, which claims priority to Korean Patent Application Nos. 10-2010-0025099 and 10-2010-0025101 filed in the Republic of Korea on Mar. 22, 2010, the disclosures of which are incorporated herein by reference.

TECHNICAL FIELD

The present disclosure relates to a secondary battery and a cover assembly for a secondary battery. More specifically, the present disclosure relates to a lithium ion secondary battery, a lithium polymer secondary battery, a lithium ion/polymer secondary battery, and a cover assembly that can be employed in these secondary batteries.

BACKGROUND ART

Generally, secondary batteries capable of repeated charging and discharging are widely used as power sources for electronic devices, including mobile phones, notebook computers and camcorders, and electric automobiles, unlike primary batteries incapable of charging and discharging. Particularly, lithium secondary batteries are operated at a voltage of 3.6 V, have a capacity about three times higher than nickel-cadmium batteries or nickel-metal hydride batteries that are mainly used as power sources for electronic systems, and have a high energy density per unit weight. Due to these advantages, the practical use of lithium secondary batteries is growing rapidly.

In such lithium secondary batteries, lithium oxides and carbon materials are used as cathode active materials and anode active materials, respectively. Lithium secondary batteries can be classified into prismatic, cylindrical and pouch-type batteries.

A typical lithium secondary battery includes an electrode assembly and an exterior material adapted to sealably house the electrode assembly together with an electrolyte solution therein. The electrode assembly includes a cathode, a separator and an anode arranged sequentially. Particularly, the exterior material of the secondary battery is prismatic or cylindrical in structure and includes a case formed with an open end and a cap assembly sealably coupled to the open end of the case.

Electrode assemblies are classified into jelly-roll type electrode assemblies and stack type electrode assemblies. A jelly-roll type electrode assembly is constructed by interposing a separator between a cathode and an anode, and winding the electrode structure. A stack type electrode assembly is constructed by alternately laminating a plurality of cathodes and anodes, each of which has a predetermined size, between which separators are interposed. The jelly-roll type electrode assembly is easy to construct and has an advantage of high energy density per unit weight. Particularly, the jelly-roll type electrode assembly is easily housed in a case for a cylindrical or prismatic battery. Due to these advantages, the jelly-roll type electrode assembly is widely used for battery fabrication. On the other hand, the stack type electrode assembly is widely used in pouch-type secondary batteries.

Figure 1:
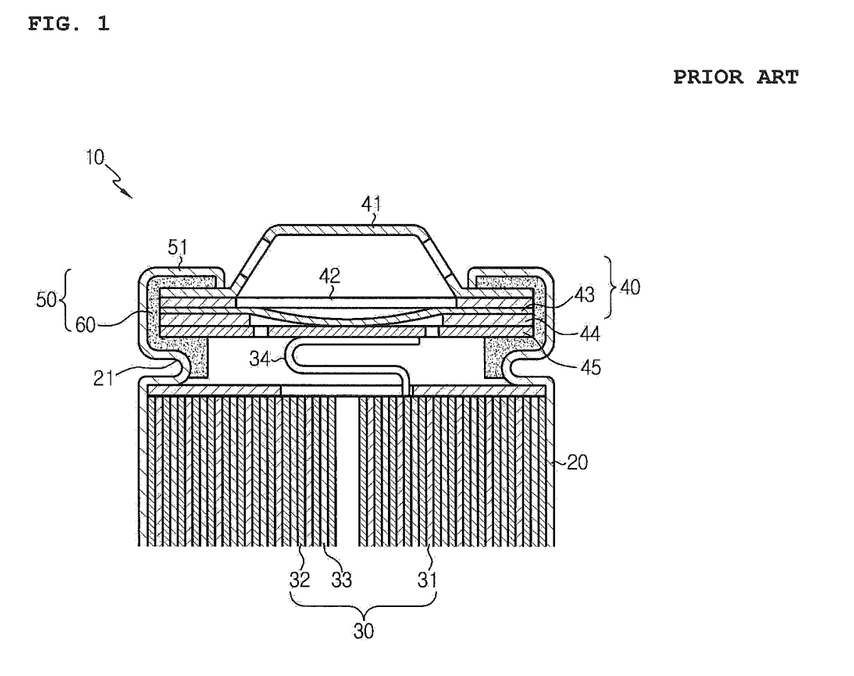
FIG. 1 is a cross-sectional view schematically illustrating the constitution of a conventional secondary battery.

FIG. 1 is a cross-sectional view of a conventional cylindrical secondary battery.

Referring to FIG. 1, the cylindrical secondary battery 10 includes a cylindrical can 20, a jelly-roll type electrode assembly 30 accommodated in the can 20, a cap assembly 40 coupled to the top of the can 20, a beading portion 21 formed by inwardly bending the wall of the can 20 to mount the cap assembly 40 thereon, and a crimping portion 50 adapted to seal the battery.

The electrode assembly 30 has a structure in which a cathode 31, an anode 32 and a separator 33 interposed between the two electrodes are wound in a jelly-roll configuration. A cathode tab 34 attached to the cathode 31 is connected to the cap assembly 40, and an anode tap (not shown) attached to the anode 32 is connected to the bottom of the can 20.

The cap assembly 40 has a structure in which a top cap 41, a positive temperature coefficient (PTC) element 42, a safety vent 43, an insulating member 44 and a cap plate 45 are laminated in this order from the top. The top cap 41 forms a cathode terminal, the PTC element 42 interrupts an electric current when the resistance of the battery increases with increasing internal temperature of the battery, the safety vent interrupts an electric current and/or exhausts gases when the internal pressure of the battery increases, the insulating member 44 electrically disconnects the safety vent 43 from the cap plate 45 except a predetermined portion, and the cap plate 45 is connected to the cathode tap 34 connected to the cathode 31. The cap assembly 40 is mounted in a gasket 60 and is mounted on the beading portion 21.

The cylindrical secondary battery is generally fabricated by inserting the jelly-roll type electrode assembly into the cylindrical can, forming the beading portion at a position of the can corresponding to the outer circumference of the top end of the electrode assembly, mounting the cap assembly provided with a packing on the beading portion, followed by subjecting the top end of the can to crimping and sizing processes. According to the sizing process, the battery is pressed using a mold in a state in which an injection hole is closed. As a result, the width of the beading portion is reduced, ensuring an internal space of the battery.

The sizing process for reducing the width of the beading portion causes downward deformation of the inner side portion of the beading portion. This downward deformation may bring about a reduction in the internal space of the battery, leading to a low capacity of the battery compared to a battery with the same specification. Further, the downwardly deformed beading portion may be brought into contact with the top end of the electrode assembly or the electrode tab. In this case, there is a possibility of short circuiting. Accordingly, the structure of the beading portion and the sizing process may cause serious problems in terms of battery safety. On the other hand, the mold is rapidly moved downward during the size process to prevent the beading portion from returning to the original width. This strong impact from the mold may increase the risk of damage to the electrode assembly.

DISCLOSURE

Technical Problem

The present disclosure is designed to solve the problems of the prior art, and therefore it is an object of the present disclosure to provide a secondary battery having a structure in which a cover assembly is laser welded to an open end of a can without the need to inwardly bend the wall of the can to form a beading portion, and a cover assembly employed in the secondary battery.

Technical Solution

According to a preferred exemplary embodiment of the present disclosure, there is provided a secondary battery including: an electrode assembly in which a cathode plate and an anode plate are arranged to face each other through a separator; a casing adapted to house the electrode assembly therein; and a cover assembly including a metallic cover welded to an open end of the casing.

Preferably, the cover assembly includes: a cover body positioned at the open end of the casing; a safety device arranged in contact with the cover body; a safety vent arranged in contact with the safety device; and a packing adapted to surround the circumferential edges of the cover body, the safety device and the safety vent, wherein the cover surrounds the packing to bring the circumferential edges of the cover body, the safety device and the safety vent into close contact with one another.

Preferably, the casing has no beading portion at a distal end thereof.

Preferably, the cover is laid on the distal end of the casing and the lower surface thereof is laser welded to the distal end of the casing.

Preferably, the casing further includes a support portion protruding from the inner surface thereof.

Preferably, the cover is inserted into the casing until it is supported by the support portion and the upper surface thereof is welded to the distal end of the casing.

Preferably, the support portion protrudes about 50 to about 100 micrometers from the side wall of the casing.

Preferably, the support portion is about 0.4 millimeters thick.

Preferably, the cover assembly further includes: a current interrupt filter welded to the safety vent and connected to the electrode assembly; and a filter packing interposed between the safety vent and the current interrupt filter.

Preferably, the packing is bent without being heat treated.

Preferably, the casing is cylindrical and the cover assembly is a cylindrical body.

Preferably, the cover includes a material selected from the group consisting of nickel, aluminum, nickel alloys and aluminum alloys.

According to a preferred exemplary embodiment of the present disclosure, there is provided a cover assembly for a secondary battery, the cover assembly being laser welded to an open end of a casing adapted to house an electrode assembly in which a cathode plate and an anode plate are arranged to face each other through a separator, wherein the cover assembly includes: a cover body positioned at the open end of the casing; a safety device arranged in contact with the cover body; a safety vent arranged in contact with the safety device; a packing adapted to surround the circumferential edges of the cover body, the safety device and the safety vent; and a cover surrounding the packing to bring the circumferential edges of the cover body, the safety device and the safety vent into close contact with one another and welded to the open end of the casing.

Preferably, the cover is laid on a distal end of the casing and the lower surface thereof is laser welded to the distal end of the casing.

Preferably, the cover is inserted into the casing until it is supported by the support portion and the upper surface thereof is welded to the distal end of the casing.

Preferably, the cover assembly further includes: a current interrupt filter welded to the safety vent and connected to the electrode assembly; and a filter packing interposed between the safety vent and the current interrupt filter.

Preferably, the packing is bent without being heat treated.

Preferably, the cover assembly is a cylindrical body.

Preferably, the cover includes a material selected from the group consisting of nickel, aluminum, nickel alloys and aluminum alloys.

Advantageous Effects

The secondary battery and the cover assembly employed therein according to the present disclosure have the following advantageous effects.

First, the secondary battery of the present disclosure can be fabricated in a simple manner without the need for beading, crimping and sizing processes required in conventional methods for the fabrication of secondary batteries.

Second, the secondary battery of the present disclosure has more internal space than a conventional secondary battery with the same specification, resulting in enhanced capacity.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein are provided for illustrative purposes only and are not intended to limit the technical scope of the present disclosure. As such, it should be understood that other equivalents and modifications could be made thereto at the time of filing the present application.

In a general cylindrical secondary battery, a cathode lead welded to a cathode foil of a jelly-roll type electrode assembly is electrically connected to a cover assembly and is connected to a terminal protruding from the top end of a cover body, and an anode lead welded to an anode foil is welded to a closed end of a casing, which itself constitutes an anode terminal. The material for the casing is not limited to a particular kind. For example, the casing may be made of stainless steel, steel, aluminum or an equivalent thereof. An electrolyte solution is injected into the casing in which the electrode assembly is already housed, the cover assembly is mounted at an open end of the casing, followed by sealing to complete the fabrication of the secondary battery.

Secondary batteries according to preferred embodiments of the present disclosure may be lithium (ion) secondary batteries with high energy density, high discharge voltage and high output stability. Such a lithium secondary battery includes a cathode, an anode, a separator, a non-aqueous electrolyte solution containing a lithium ion, and the like. For example, the cathode is produced by applying a mixture of a cathode active material, a conductive material and a binder onto a cathode current collector, and drying the mixture. If necessary, a filler may be further added to the mixture. The anode is produced by applying an anode active material onto an anode current collector, and drying the active material. If necessary, one or more components mentioned as the materials for the cathode may be used together with the anode active material. The separator is interposed between the cathode and the anode. An insulating thin film with high ion permeability and mechanical strength is used as the separator. The non-aqueous electrolyte solution containing a lithium ion is composed of a non-aqueous electrolyte solution and a lithium salt. For example, the non-aqueous electrolyte solution is a non-aqueous liquid electrolyte solution, a solid electrolyte or an inorganic solid electrolyte. The current collectors, the electrode active materials, the conductive material, the binder, the filler, the separator, the electrolyte solution, the lithium salt, etc. are widely known in the art, and thus their detailed description is omitted.

Secondary batteries and cover assemblies according to preferred embodiments of the present disclosure will be explained in detail with reference to the accompanying drawings.

Figure 2:
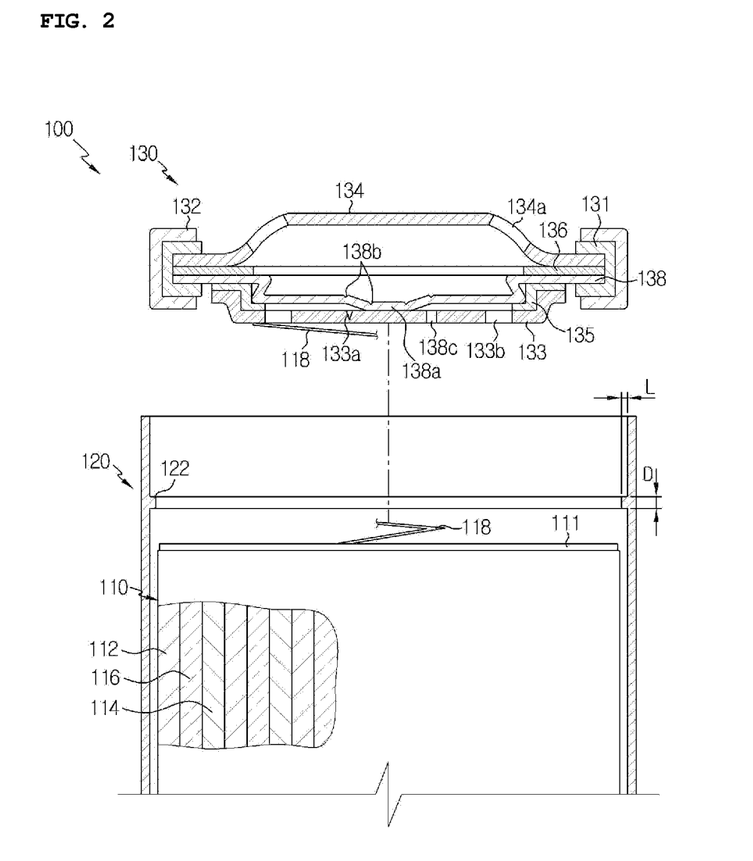
FIG. 2 is an exploded cross-sectional view schematically illustrating the constitution of a secondary battery employing a cover assembly according to a first preferred exemplary embodiment of the present disclosure.
Figure 3:
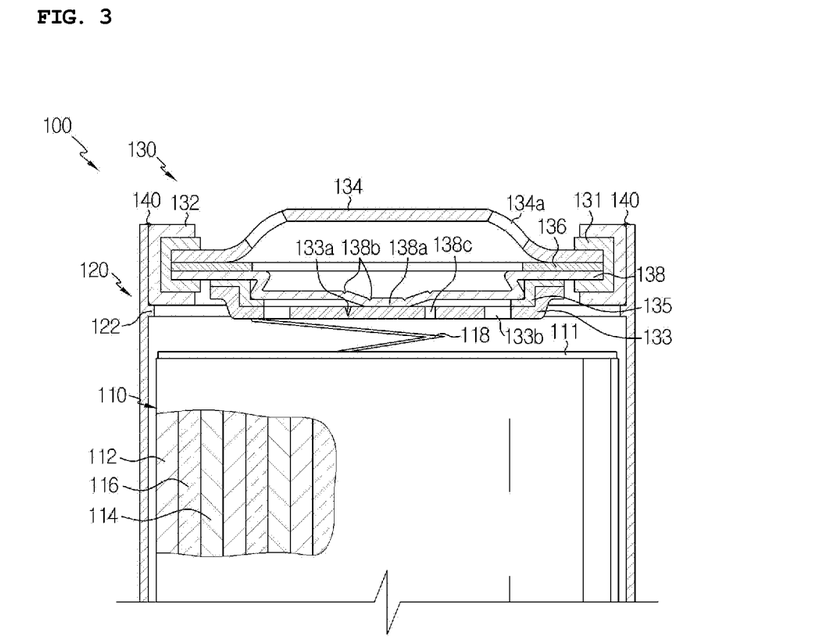
FIG. 3 is a cross-sectional view illustrating an assembled state of the secondary battery of FIG. 2.

FIG. 2 is an exploded cross-sectional view schematically illustrating the constitution of a secondary battery employing a cover assembly according to a first preferred exemplary embodiment of the present disclosure, and FIG. 3 is a cross-sectional view illustrating an assembled state of the secondary battery of FIG. 2.

Referring to FIGS. 2 and 3, the cover assembly 130 of the present disclosure includes a cover 132 laid on the top of an open end of a cylindrical casing 120 adapted to house an electrode assembly 110 together with an electrolyte solution therein, or inserted into the open end of the casing 120 where it is sealably welded. Reference numeral 100 in the figures represents a secondary battery.

The electrode assembly 110 includes two sheet-like electrode plates 112 and 114 with different polarities and a separator 116 interposed between the electrode plates 112 and 114 or arranged at a side of either of the electrode plates 112 and 114 to insulate the electrode plates 112 and 114 from each other. This electrode structure is preferably wound in a so-called 'jelly roll' configuration. It should, of course, be understood that the electrode assembly 110 may have a structure in which the cathode plate 112 and the anode plate 114, each of which has a predetermined specification, between which the separator 116 is interposed, are laminated. Each of the two electrode plates 112 and 114 has a structure in which an active material slurry is applied to a current collector in the form of a metal foil or mesh including aluminum and copper. The slurry is usually prepared by adding a particulate active material, an auxiliary conductor, a binder, a plasticizer, etc. to a solvent, and stirring the mixture. The solvent is removed in a subsequent process. It is preferred that portions uncoated with the slurry are formed at both distal ends of each of the current collectors in the winding direction of the electrode plates 112 and 114. Leads 118 are attached to the uncoated portions of the corresponding electrode plates 112 and 114. The lead 118 attached to the top end of the electrode assembly 110 is electrically connected the cover assembly 130 and the second lead (not shown) attached to the lower end of the electrode assembly 110 is connected to the bottom of the casing 120. Of course, all of the lead 118 and the second lead may also be drawn toward the cover assembly 130.

It is preferred to arrange the electrode assembly 110 on a first insulating plate (not shown) placed on the bottom of the casing 120 and to arrange a second insulating plate 111 on the top end of the electrode assembly 110. The first insulating plate insulates the electrode assembly 110 from the bottom of the casing 120 and the second insulating plate 111 insulates the electrode assembly 110 from the cover assembly 130.

The casing 120 is composed of a lightweight conductive metal material, such as aluminum, stainless steel or an alloy thereof. The casing 120 has a cylindrical structure having an open portion whose top end is open and a closed bottom portion opposite thereto. The electrode assembly 110 and an electrolyte solution (not shown) are accommodated in the internal space of the casing 120. The electrolyte solution serves to conduct lithium ions formed by an electrochemical reaction between the electrode plates 112 and 114 during charge/discharge. The electrolyte solution may be a mixture of a lithium salt and a high-purity organic solvent as a non-aqueous organic electrolyte solution, or a polymer using a polymer electrolyte, but it does not matter which kind is used for the electrolyte solution.

On the other hand, a center pin (not shown) may be inserted into the center of the casing 120 to prevent unwinding of the electrode assembly 110 wound in a jelly roll configuration. Another role of the center pin is a path through which gases move in the secondary battery 100. The casing 120 has no beading portion (see 21 of FIG. 1) at a top end thereof, that is, the open portion has a substantially flat inner wall structure. The casing 120 has a support portion 122 protruding from the inner wall thereof. The support portion may be formed by forging the casing 120. The support portion 122 is formed at a predetermined depth from the open distal end of the casing 120. The depth substantially corresponds to the length of the cover 132 of the cover assembly 130. The support portion 122 protrudes a length L of about 50 to about 100 micrometers inwardly from the wall surface of the casing 120 and has a thickness D of about 0.4 millimeters. The cover 132 of the cover assembly 130 is inserted into the casing 120 until the lower surface thereof comes into contact with the support portion 122.

The cover assembly 130 includes a cover body 134 positioned at the open end of the casing 120, a safety device 136 arranged in contact with the cover body 134, a safety vent 138 arranged in contact with the safety device 136, and a packing 131 adapted to surround the circumferential edges of the cover body 134, the safety device 136 and the safety vent 138. The cover 132 surrounds the packing 131 to bring the circumferential edges of the cover body 134, the safety device 136 and the safety vent 138 into close contact with one another. In a state in which the cover 132 is inserted into the open end of the casing 120, the cover 132 is welded (e.g., laser welded) to the distal end of the casing 120 to form a welding portion 140.

The cover body 134 has an electrode terminal (not shown) for electrical connection to the outside and is formed with holes 134a through which gases can be released. The cover body 134 may be made of, for example, a metal material such as stainless steel or aluminum.

The safety device 136 is interposed between and electrically connects the cover body 134 and the safety vent 138. The safety device 136 interrupts the flow of electric current in the battery 100 when the battery 100 overheats and may be, for example, a positive temperature coefficient (PTC) element.

The safety vent 138 has a welding portion 138a protruding at the center thereof and notched portions 138b formed around the welding portion 138a. The welding portion 138a of the safety vent 138 is welded to a current interrupt filter (CID) 133. The current interrupt filter (CID) 133 and the safety vent 138 may be deformed together by an internal pressure of the secondary battery 100. The current interrupt filter 133 is insulated from the safety vent 138 by a filter packing 135. Notches 133a are formed at predetermined positions of the current interrupt filter 133. The filter packing 135 supports the current interrupt filter 133, so that an electric current of the safety vent 138 can be interrupted after the current interrupt filter 133 is disconnected.

When the safety vent 138 and the current interrupt filter 133 are deformed by an abnormal internal pressure of the secondary battery 100, the welding portion 138a of the safety vent 138 remains unseparated and, instead, the notches 133a of the current interrupt filter 133 or the notched portions 138b of the safety vent are torn apart. Accordingly, it is preferred that the operating pressure of the secondary battery 100 is determined depending on the dimensional factors (such as thickness, width and angle) of the notches 133a and the notched portions 138b. In conclusion, the notches 133a and the notched portions 138b function to interrupt an electric current of the secondary battery 100 when the internal pressure of the battery 100 reaches a designed value or above. More specifically, when gases are continuously produced after the current interrupt filter 133 is disconnected by an abnormal internal pressure, the notched portions 138b of the safety vent 138 are primarily vented. For smooth release of the gases, holes 133b of the current interrupt filter 133, holes formed as a result of the venting of the safety vent 138 and the gas holes 134a of the cover body 134 are designed to be in communication with one another. Small holes 138c are provided near the welding portion 138a of the current interrupt filter 138 to assist in forming the notched portions 138b.

The current interrupt filter 133 is coupled to the filter packing 135 in a press-fit manner. Otherwise, the current interrupt filter 133 is freely moveable after disconnection and may come into contact with the casing 120, which increases the possibility causing short circuiting.

The packing 131 is bent in an angled 'C' shape to surround the circumferential edges of the cover body 134, the safety device 136 and the safety vent 138. The packing 131 is made of an electrically insulating, impact resistant, elastic and durable material, for example, polyolefin or polypropylene (PP). It is preferred to bend the packing 131 by mechanical processing without undergoing thermal deformation. The reason for this is because heat treatment deteriorates the insulation properties of the packing 131.

In a preferred embodiment, the cover 132 may be bent in a substantially angled 'C' shape to surround the outer surface of the packing 131. The cover 132 is structured such that it is inserted into the open end of the casing 120 and is situated on the support portion 122. In this case, an edge of the upper surface of the cover 132 is laser welded to the distal end of the casing 120. For the laser welding, the cover 132 includes a material selected from the group consisting of nickel, aluminum, nickel alloys and aluminum alloys.

In the construction of the cover assembly 130 according to this embodiment, the packing 131 and the cover 132 are assembled to the circumferential edges of the cover body 134, the safety device 136 and the safety vent 138 by bending the packing 131 so as to surround the circumferential edges of the body 134, the safety device 136 and the safety vent 138 in a state in which the members 134, 136 and 138 are laminated on one another, and bringing the cover 132 into close contact with the outer circumference of the packing 131 while bending the cover 132. According to an alternative method, the cover 132 and the packing 131 are bent in a substantially angled 'C' shape, the members 134, 136 and 138 are inserted into a space defined by the bent packing 131, and the cover 132 and the packing 131 are brought into close contact with the members 134, 136 and 138.

Figure 4:
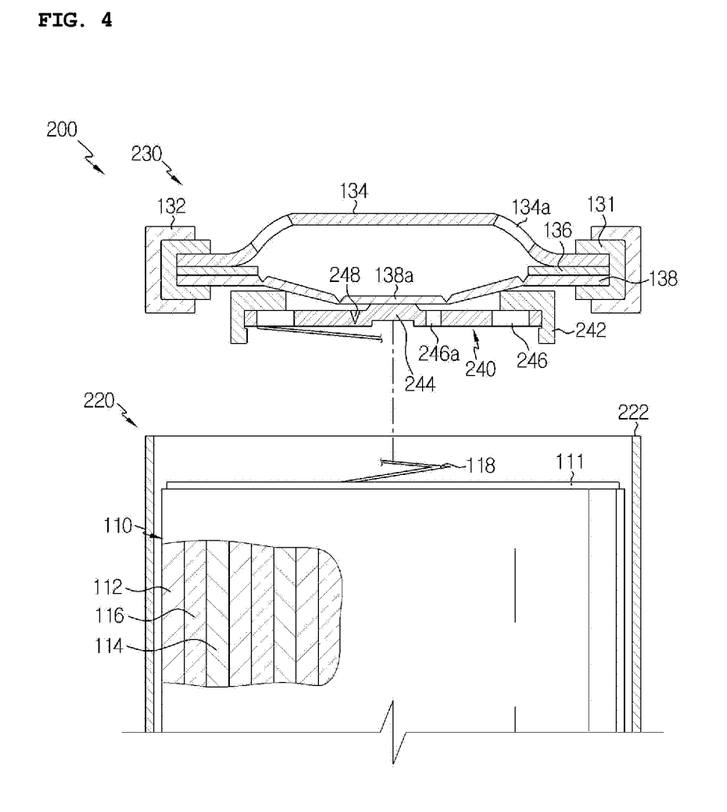
FIG. 4 is an exploded cross-sectional view schematically illustrating the constitution of a secondary battery employing a cover assembly according to a second preferred exemplary embodiment of the present disclosure.
Figure 5:
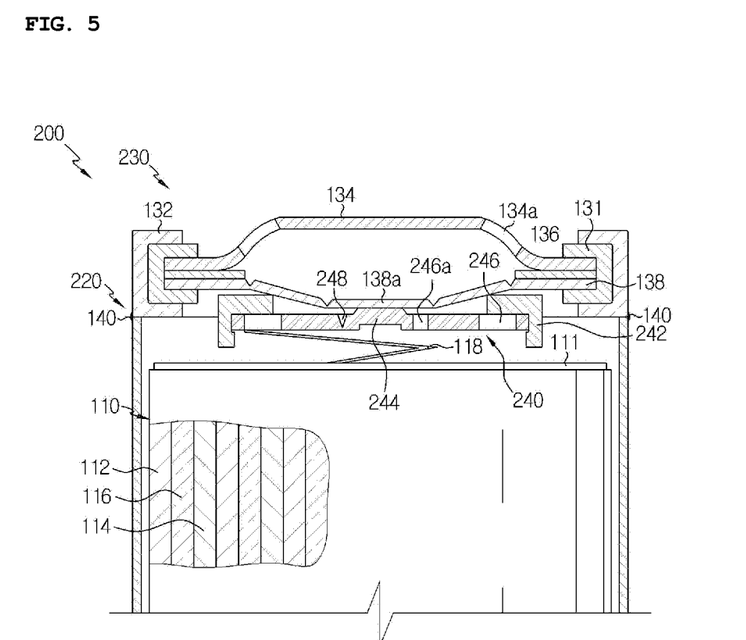
FIG. 5 is a cross-sectional view illustrating an assembled state of the secondary battery of FIG. 4.

FIG. 4 is an exploded cross-sectional view schematically illustrating a secondary battery employing a cover assembly according to a second preferred exemplary embodiment of the present disclosure, and FIG. 5 is a cross-sectional view illustrating an assembled state of the secondary battery of FIG. 4. The same reference numerals are given to the same elements having the same functions as those of FIGS. 2 and 3.

Referring to FIGS. 4 and 5, the cover assembly 230 according to this embodiment includes a cover 132. The cover 132 is laid on a distal end 222 of an open end of the casing 220, and an edge portion of the lower surface of the cover 132 is laser welded to the distal end 222 of the casing 220 to form a welding portion 140. The cover assembly 230 has substantially the same constitution as that of the first embodiment, except for the construction of a current interrupt device 240 connected to a safety vent 138. The materials and structures of the other elements of the cover assembly 230 and the assembly process thereof are the same as those described in the previous embodiment, and thus their detailed description is omitted. Reference numeral 200 represents a secondary battery.

More specifically, in the secondary battery 200 according to this embodiment, the cover 132 of the cover assembly 230 is not inserted into the inner wall of the distal end 222 of the casing 220 but is laid on and welded to the distal end 222 of the casing 220. This makes the fabrication procedure of the secondary battery 200 superior in terms of assembly efficiency compared to that of the secondary battery 100 according to the first embodiment. Thus, in this embodiment, there is no need to form the support portion 122 in the casing 220.

In the cover assembly 230 according to this embodiment, an interruption packing 242 surrounding the current interrupt device 240 insulates the current interrupt device 240 from a safety vent 138. The current interrupt device 240 has a protrusion 244 formed at the center thereof, where it is welded to a central welding portion 138a of the safety vent 138. A cathode lead 118 of the electrode assembly 110 is electrically connected to a portion other than the protrusion 244. Three through-holes 246 are formed concentrically around the protrusion 244. Notches 248 are formed around the through-holes 246. Three through-holes 240a, through which gases are released, are formed in the form of circular arcs at radially symmetric positions about the central axis around the outer circumference of the current interrupt device 240.

On the other hand, the cover assembly 130 according to the first embodiment and the cover assembly 230 according to the second embodiment can be used interchangeably. That is, the cover assembly 130 according to the first embodiment may be simply laid on and welded (e.g., laser welded) to the distal end 222 of the open end 222 of the cover assembly 230 according to the second embodiment, and the cover assembly 230 according to the second embodiment may be inserted into the open end of the casing 120, followed by welding (e.g., laser welding).

The present disclosure has been described in detail. However, it should be understood that the detailed description and specific examples, while indicating preferred embodiments

EXPLANATION OF REFERENCE NUMERALS

| | | | |
|---|---|---|---|
| 100, 200 | Secondary batteries | 110 | Electrode assembly |
| 111 | Second insulating plate | 112, 114 | Electrode plates |
| 116 | Separator | 118 | Lead |
| 120, 220 | Casings | 122 | Support portion |
| 130, 230 | Cover assemblies | 131 | Packing |
| 132 | Cover | 134 | Cover body |
| 136 | Safety device | 138 | Safety vent |
| 222 | Distal end | | |
| 240 | Current interrupt device | 244 | Protrusion |

What is claimed is:

1. A secondary battery comprising:
   an electrode assembly in which a cathode plate and an anode plate are arranged to face each other through a separator;
   a casing adapted to house the electrode assembly therein; and
   a cover assembly comprising a metallic cover having a cylindrical side wall and a lower surface horizontally elongated from the cylindrical side wall toward a central axis of the casing, wherein a lower edge portion of the lower surface is welded to a distal end of an open end of the casing such that the lower end of the cylindrical side wall is located on the distal end of the open portion of the casing, the cylindrical side wall being externally exposed after welding, and the lower surface not contacting an inner wall of the casing;
   wherein an open portion of the casing has a substantially flat outer wall to a location corresponding to the distal end.

2. The secondary battery according to claim 1, wherein the cover assembly comprises:
   a cover body positioned at the open end of the casing;
   a safety device arranged in contact with the cover body;
   a safety vent arranged in contact with the safety device; and
   a packing adapted to surround the circumferential edges of the cover body, the safety device and the safety vent,
   wherein the cover surrounds the packing to bring the circumferential edges of the cover body, the safety device and the safety vent into close contact with one another.

3. The secondary battery according to claim 1, wherein the casing has an unbent portion where the cover is positioned.

4. The secondary battery according to claim 3, wherein the edge portion of the cover is laser welded to the distal end of the casing.

5. The secondary battery according to claim 2, wherein the cover assembly further comprises: a current interrupt filter welded to the safety vent and connected to the electrode assembly; and a filter packing interposed between the safety vent and the current interrupt filter.

6. The secondary battery according to claim 2, wherein the packing is mechanically bent without undergoing thermal deformation.

7. The secondary battery according to claim 1, wherein the cover assembly is in the form of a disk.

8. The secondary battery according to claim 1, wherein the cover comprises a material selected from the group consisting of nickel, aluminum, nickel alloys and aluminum alloys.

* * * * *